United States Patent [19]

Mahon

[11] 4,394,695
[45] Jul. 19, 1983

[54] METHOD AND APPARATUS FOR EVALUATING RECORDING SYSTEMS

[75] Inventor: Douglas K. Mahon, Boulder Creek, Calif.

[73] Assignee: Sharp Corporation, Osaka, Japan

[21] Appl. No.: 230,699

[22] Filed: Feb. 2, 1981

[51] Int. Cl.³ ............................................. G11B 5/09
[52] U.S. Cl. ........................................ 360/53; 360/51
[58] Field of Search ..................... 360/40, 41, 42, 43, 360/51, 53

[56] References Cited

U.S. PATENT DOCUMENTS

| | | | |
|---|---|---|---|
| 3,287,714 | 11/1966 | Dustin | 360/51 |
| 3,487,363 | 12/1969 | Wall | 360/53 |
| 3,519,988 | 7/1970 | Grossman | 360/53 |
| 3,524,164 | 8/1970 | Cox et al. | 360/53 |
| 4,281,356 | 7/1981 | Sousa | 360/51 |

OTHER PUBLICATIONS

"Effect of Bitshift Distribution on Error Rate in Magnetic Recording", Katz et al, IEEE Transactions on Magnetics, vol. Mag. 15, #3, 5/79.

Primary Examiner—Vincent P. Canney
Attorney, Agent, or Firm—Flehr, Hohbach, Test, Albritton & Herbert

[57] ABSTRACT

Apparatus and method for evaluating a recording system which simultaneously passes the reproduced data through a plurality of sampling windows leaving different effective window size and compares the sampled data with the original data to provide an evaluation of error.

7 Claims, 12 Drawing Figures

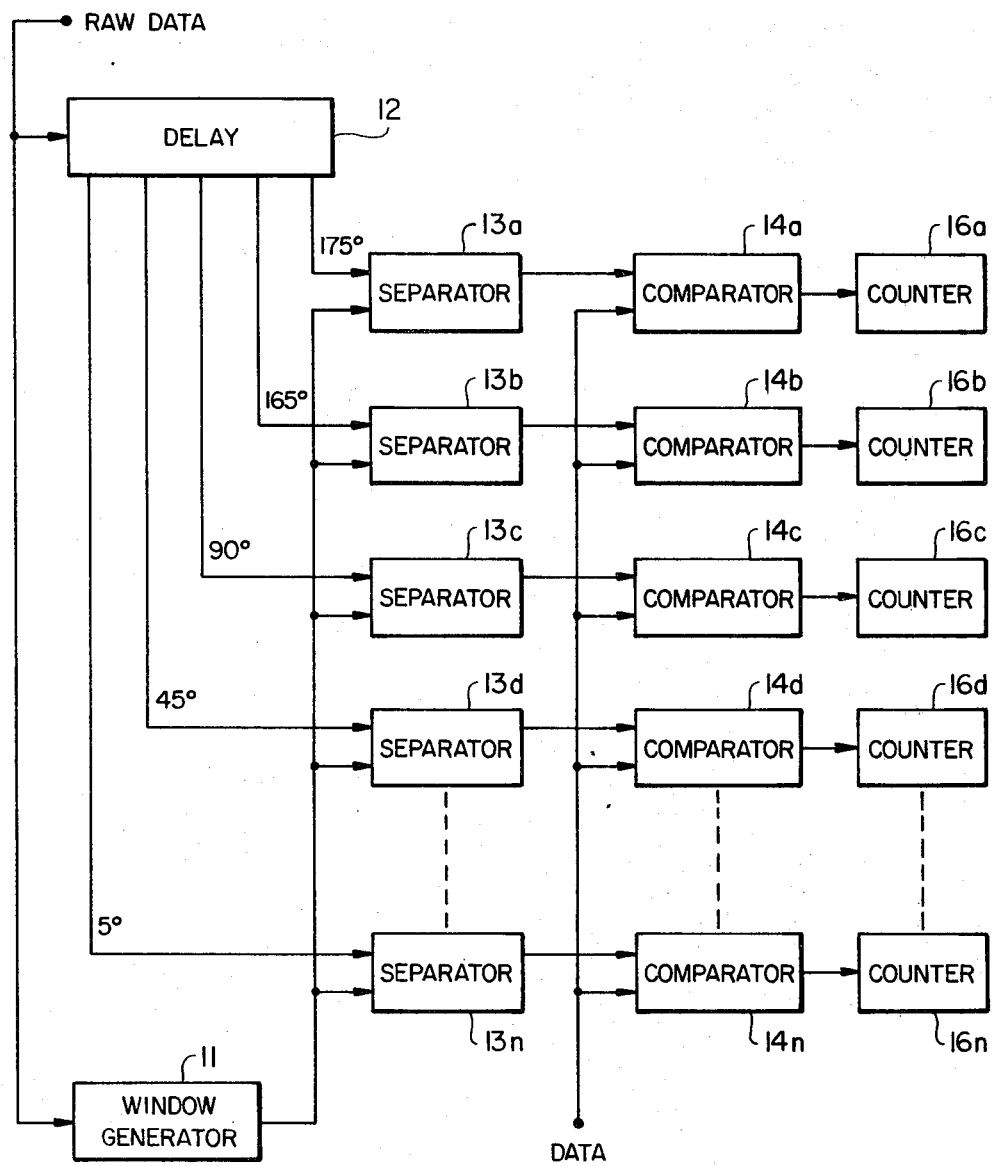
FIG_1

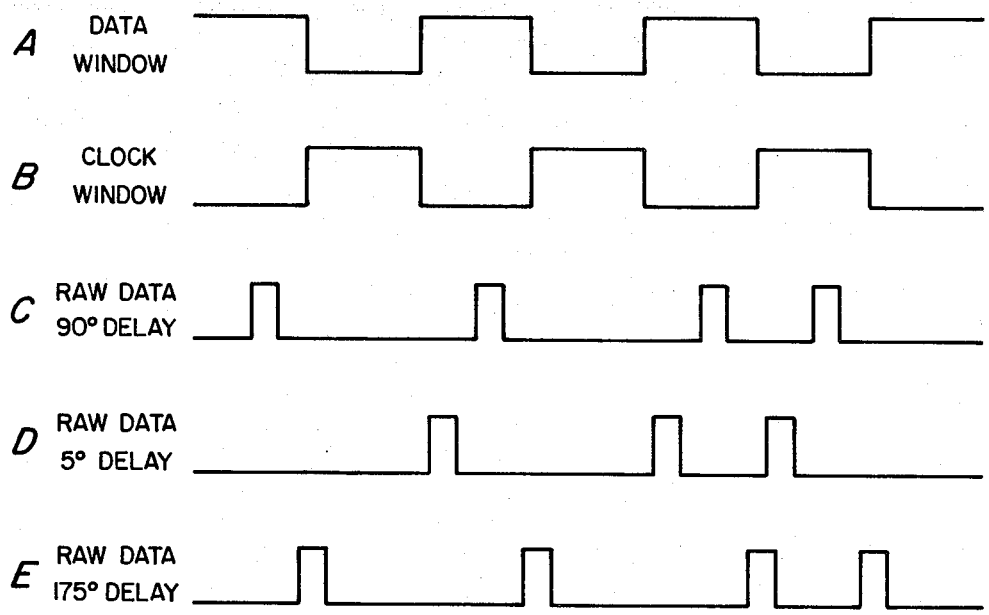
FIG_2
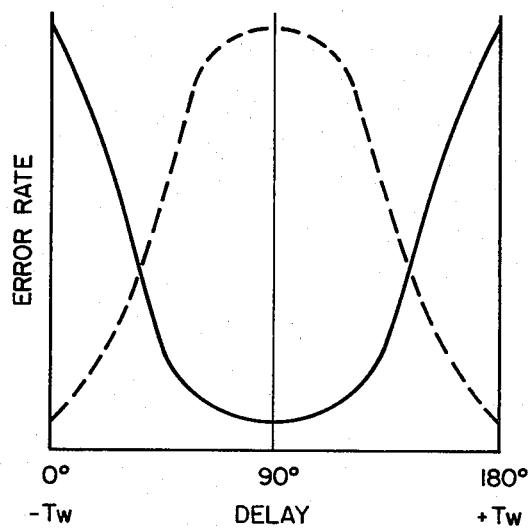
FIG_3

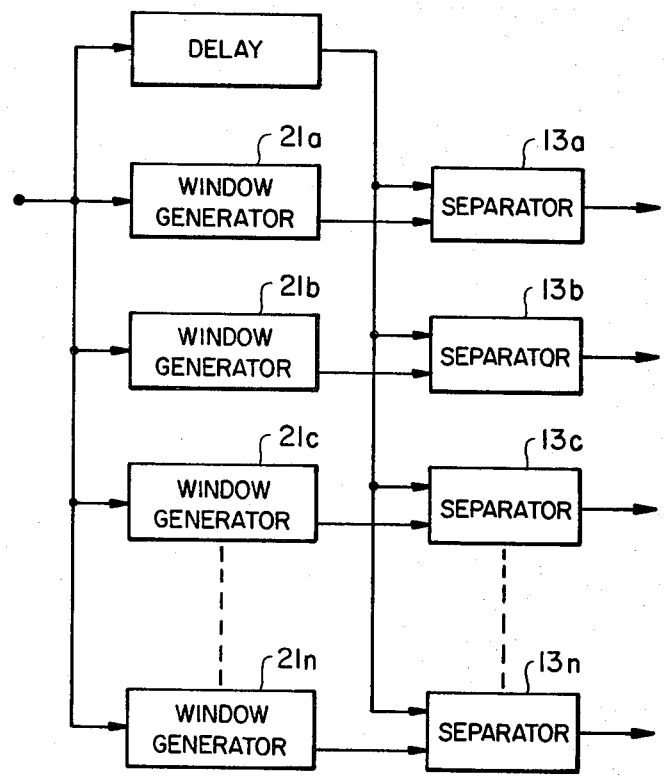
*FIG_4*
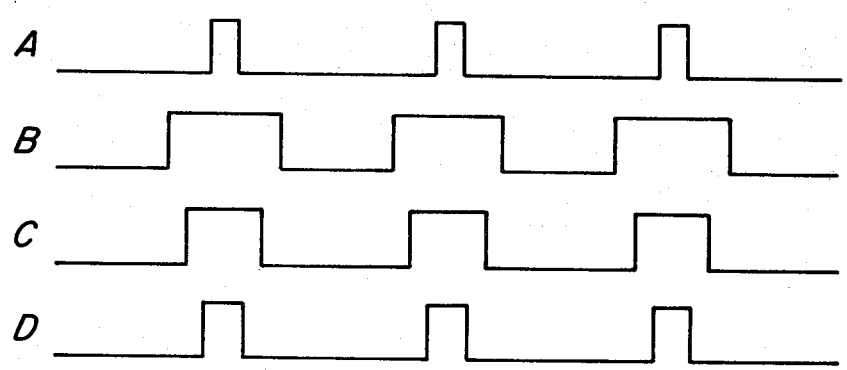
*FIG_5*

METHOD AND APPARATUS FOR EVALUATING RECORDING SYSTEMS

This invention relates generally to a method and apparatus for evaluating a magnetic recording system.

The bit error rate in digital magnetic recording systems is a measure of their performance. It may be defined as the fraction of bits detected in a bit stream that differ from those actually recorded on the recording media and read therefrom. The bit error rate arises from the defects in the system such as adjacent track pickup, poor tracking, etc.

Generally data is recorded in serial intervals with one bit in each interval. When the data is read back the associated circuits provide a window for each bit. A pulse detected in the window is a "one" and no pulse is "0". If the window is narrow bits may not be detected because they will be shifted outside of the window time interval. The recording system may be evaluated by measuring the error rate as a function of the window size. Katz and Campbell have described the bit error rate in an article entitled "Effect of Bitshift Distribution on Error Rate in Magnetic Recording", IEEE Transactions on Magnetics, Vol. Mag-15, No. 3, May 1979. They described a process for evaluating a recording system by using a data separator that runs at the data clocking rate and has an adjustable window width.

The bits that fall outside the window are counted as errors. This information is then used to predict the recording system error rate since a direct measure of error rate cannot be made in a reasonable time. In order to obtain a measure of the error rate tests must be run at a number of window widths. In the prior art this has been done sequentially requiring a considerable amount of time to completely test a recording apparatus.

It is an object of the present invention to provide an improved method and apparatus for evaluating recording systems.

It is another object of the present invention to provide an apparatus and method in which a plurality of windows of different width are simultaneously used to provide a plurality of simultaneous measurement of bit error rate.

The foregoing and other objects of the invention are achieved by a system for evaluating recording systems which includes means responsive to the raw data for providing a plurality of windows having leading and trailing edges for separating the reproduced data and means for relatively moving at least one edge of each of said windows a predetermined different amount with respect to the normal distribution of the reproduced data and means for receiving the data separated by each of said windows and comparing it to the original data to provide an indication of the error for each of said windows.

The foregoing and other objects will be more clearly understood from the following description taken in connection with the accompanying drawings in which:

FIG. 1 is a block diagram of a bit error rate testing system in accordance with one embodiment of the invention;

FIG. 2, consisting of A-E, are signal waveforms useful in understanding operating of the circuit of FIG. 1;

FIG. 3 is a diagram showing the bit shift distribution as a function of window width;

FIG. 4 shows another embodiment of the present invention; and

FIG. 5, consisting of A-D, shows a timing diagram useful in understanding the apparatus of FIG. 4.

As described above a recording system is evaluated by directly measuring the error rate as a function of the data window size or width. The information is obtained by using a data separator that runs at the data clocking rate and has an adjustable window width. Bits that fall outside the chosen window are counted as errors. The errors increase with decreasing window width. In the testing of recording systems in the prior art the equipment is run for a predetermined time with a window of one width, the window width is then reduced and the equipment again run etc. until sufficient convenient window widths are measured to enable one to determine the intrinsic error rate for the equipment at a window width which corresponds to the operating window for the device.

In accordance with the present invention there is provided a method and apparatus which measures simultaneously the error rate for a plurality of window widths whereby the testing time is considerably reduced.

Referring to FIG. 1 the raw data is applied to a window generator 11 which generates a window of predetermined width at the data clocking rate. Suitable window generators are well known and have been described as an example in U.S. Pat. No. 3,810,234. The data and clock windows generated by the window generator 11 are illustrated in FIGS. 2A and 2B. The raw data is also applied to a delay means 12 which may be a tapped delay line which delays the signal predetermined amounts with respect to the front edge of the data window triggered by the raw data. In usual operation the signal is delayed 90° as shown in FIG. 2C whereby it falls in the center of the window. In accordance with the present invention a plurality of outputs are obtained from the delay means 12 and applied to the data separators 13a-13n. It is seen that if the data is only delayed 5°, FIG. 2D, it is tantamount to moving the front edge of the window whereby a large error rate is obtained as shown in FIG. 3. On the other hand, if the signal is delayed 90°, as conventionally done in retrieving information during normal operation the minimum error rate is obtained. An additional delay, FIG. 2E, will again increase the error rate since bits will then be lost on the other side of the window. The dotted curve in FIG. 3 shows the normal distribution of the pulses while the solid curve shows the increase in error rate for various signal delays. Thus, in accordance with the present invention changing width of the window is simulated by providing different delays. The data output from the separator is applied to an associated comparator 14a-14n which also receives data which is representative of the original data. The comparator compares the original data and recovered data and provides a different signal which is indicative of the error rate. This signal may be applied to associated counters 16a-16n or other circuits, it is then used to plot a curve which is extended, as taught in the aforementioned article, to determine the intrinsic error rate. It is seen that the testing is done in parallel and the time consumed is relatively short.

Rather than delaying the raw data as described above the data may be applied directly to a plurality of window generators 21a-21n each of which generates a window of different width as shown by the windows shown in FIGS. 5B, 5C and 5D responsive to the data pulses. In FIG. 5A the data pulses have been delayed by 90° so that they fall in the center of the windows. Again, with the normal window the maximum amount of data is recovered and as the window narrows more and more data falls outside of the window indicating an error. The window and the data pulses are applied to separators 13a–13n. The output of the separators are applied to comparators of the type previously described for comparison to the data and then to counters to indicate the errors.

Thus, there has been provided a bit error detecting and measuring apparatus and method in which a plurality of data is obtained simultaneously by use of separating windows of different effective size obtained in one instance by shifting the data with respect to the window and in another by providing different size windows.

What is claimed is:

1. Apparatus for evaluating recording systems including means responsive to the raw data for generating a plurality of data windows having leading and trailing edges, a plurality of data separators connected to receive said data windows and the reproduced data and serving to separate out data which falls outside the windows, means for providing at each of said separators different relative positions between at least one edge of said window and said data to thereby provide different effective sized windows at each of said separators for separating out the data.

2. Apparatus as in claim 1 in which said means for providing at each of said separators different relative positions between at least one edge of said window and said data comprises means for delaying the data applied to each of said separators a different amount.

3. Apparatus as in claim 1 in which said means for providing different relative positions between at least one edge of said window and said data comprises means for providing windows having different widths to said separators.

4. Apparatus as in claim 1 including means for receiving the separated data and providing an output indicative of errors.

5. The method of evaluating a recording system which includes passing the data reproduced from said system simultaneously through a plurality of windows each having a different effective window width to separate data at each of said widths and comparing said separated data with the reproduced data to provide error signals for each of said windows.

6. An apparatus for evaluating a recording system by measuring the error rate as a function of effective window size including means providing window pulses having a leading edge, delay means for receiving the raw data and providing data outputs having a plurality of fixed delays with respect to the leading edge of said window and a plurality of separator means each receiving the window pulses and the delayed data to separate the data and means for receiving the separated data and comparing it to the original data to provide an indication of the error rate for each data delay.

7. A system for evaluating a recording medium by measuring the error rate as a function of window size including means responsive to the raw data for providing a plurality of windows of different sizes and separating means for receiving the data and windows means for separating the data, and means for comparing to the original data to provide an indication of error to separated data.

* * * * *

UNITED STATES PATENT AND TRADEMARK OFFICE
CERTIFICATE OF CORRECTION

PATENT NO. : 4,394,695
DATED : July 19, 1983
INVENTOR(S) : Douglas K. Mahon

It is certified that error appears in the above—identified patent and that said Letters Patent is hereby corrected as shown below:

On the title page assignee should read

[73] Assignee: Seagate Technology, Inc.
Scotts Valley, California

Signed and Sealed this

Fourth Day of December 1984

[SEAL]

Attest:

GERALD J. MOSSINGHOFF

*Attesting Officer*   *Commissioner of Patents and Trademarks*